(12) United States Patent
Kloft et al.

(10) Patent No.: US 10,454,255 B2
(45) Date of Patent: Oct. 22, 2019

(54) CABLE DUCT LID THAT CAN BE WALKED ON, CABLE DUCT, AND METHOD FOR PRODUCING A CABLE DUCT LID THAT CAN BE WALKED ON

(71) Applicant: NIEDAX GmbH & Co. KG, Linz am Rhein (DE)

(72) Inventors: Martin Kloft, Hargarten (DE); Thomas Ewenz, Vettelschoss (DE)

(73) Assignee: NIEDAX GmbH & Co. KG (DE)

( * ) Notice: Subject to any disclaimer, the term of this patent is extended or adjusted under 35 U.S.C. 154(b) by 0 days.

(21) Appl. No.: 15/903,239

(22) Filed: Feb. 23, 2018

(65) Prior Publication Data

US 2018/0183223 A1 Jun. 28, 2018

Related U.S. Application Data

(63) Continuation of application No. PCT/EP2016/065552, filed on Jul. 1, 2016.

(30) Foreign Application Priority Data

Aug. 28, 2015 (EP) ..................................... 15182882

(51) Int. Cl.
  *H02G 3/04* (2006.01)
  *H02G 3/06* (2006.01)

(52) U.S. Cl.
  CPC ......... *H02G 3/0418* (2013.01); *H02G 3/0437* (2013.01); *H02G 3/0608* (2013.01)

(58) Field of Classification Search
  CPC ... H02G 3/0418; H02G 3/0437; H02G 3/0608
  (Continued)

(56) References Cited

U.S. PATENT DOCUMENTS 4,349,220 A * 9/1982 Carroll ................. H02G 3/0608
                                                                138/155
6,333,461 B1 * 12/2001 Marcou ................ H02G 3/0418
                                                                174/68.3
(Continued)

FOREIGN PATENT DOCUMENTS

DE      102014114153 A1    4/2015
EP         1345302 A1    9/2003
(Continued)

OTHER PUBLICATIONS

International Search Report, International Application No. PCT/EP2016/065552, dated Aug. 30, 2016 (2 pgs.).

(Continued)

*Primary Examiner* — Dhiru R Patel
(74) *Attorney, Agent, or Firm* — Seager, Tufte & Wickhem LLP (57) ABSTRACT

The present invention relates to a cable duct lid that can be walked on with a cover member having an upper surface and a lower surface, and two lateral parts protruding from the cover member, said lateral parts each forming a lateral edge of the cable duct lid. The upper surface of the cover member includes a structured central region that is formed by way of embossing or impressing from the lower surface and that provides a slip-resistant surface. The upper surface of the cover member has a non-structured periphery on each of both sides of the structured central region towards the respective lateral edge, said non-structured periphery having a width of 5 mm or more. The invention further relates to a cable duct with a cable duct tray, a cable duct lid that can be walked on as described above, and at least one lid retaining spring and/or at least one quarter-turn lock for mounting the cable duct lid onto the cable duct tray. A production method (Continued)

according to the invention for producing the cable duct lid that can be walked on is also disclosed.

15 Claims, 4 Drawing Sheets

(58) Field of Classification Search
USPC .......................................................... 174/68.3
See application file for complete search history.

(56) References Cited

U.S. PATENT DOCUMENTS

| | | | |
|---|---|---|---|
| 6,437,243 B1* | 8/2002 | VanderVelde | H02G 3/0418 174/101 |
| 6,803,519 B2* | 10/2004 | de la Borbolla | H02G 3/0418 174/480 |

FOREIGN PATENT DOCUMENTS

| | | |
|---|---|---|
| FR | 2955981 A1 | 8/2011 |
| GB | 1392957 A | 5/1975 |
| GB | 2232179 A | 12/1990 |
| WO | 2010034298 A1 | 4/2010 |
| WO | 2010096441 A1 | 8/2010 |

OTHER PUBLICATIONS

European Search Report, European Application No. 15182882.9, dated Jan. 29, 2016 (5 pgs.).

European Examination Report, Application No. 15182882.9, dated Feb. 27, 2018.

Notification Concerning Transmittal of International Preliminary Report on Patentability, International Application No. PCT/EP2016/065552, dated Mar. 15, 2018 (9 pgs.).

Search Report for EP Divisional Patent Application No. 18194217.8 dated Jan. 24, 2019.

* cited by examiner

CABLE DUCT LID THAT CAN BE WALKED ON, CABLE DUCT, AND METHOD FOR PRODUCING A CABLE DUCT LID THAT CAN BE WALKED ON

CROSS-REFERENCE TO RELATED APPLICATIONS

This application is a continuation of International Application No. PCT/EP2016/065552, filed Jul. 1, 2016, which claims priority to EP Application No. 15182882.9, filed Aug. 28, 2015, the contents of which are herein incorporated by reference in their entirety.

TECHNICAL FIELD

The present invention relates to a cable duct lid that can be walked on as well as a cable duct which is provided with a cable duct lid that can be walked on, and a method for producing a cable duct lid that can be walked on.

BACKGROUND

Figure 1:
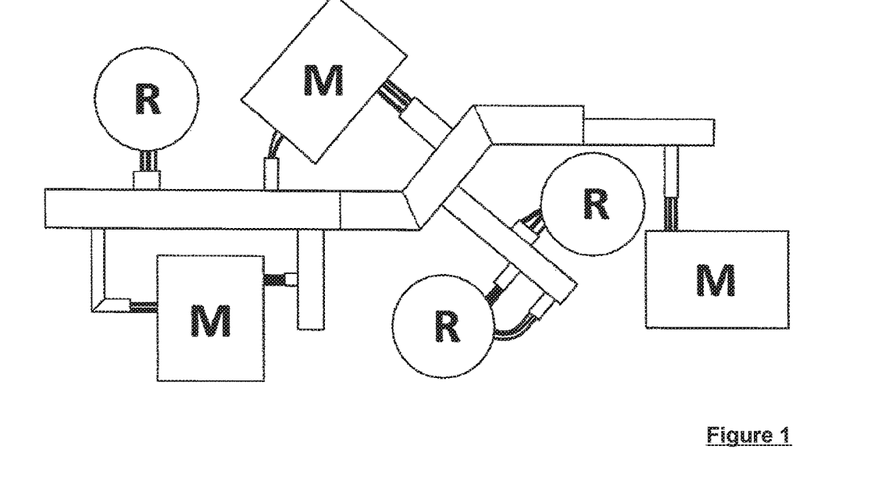
FIG. 1 is a schematic view of a mounting example for cable duct systems.

Cable tray or cable duct systems that can be walked on are deployed, e.g., in order to link supply chains of individual elements of industrial plants, in particular to advance electric lines to machines or robots, as schematically shown in FIG. 1. For this purpose, cable duct systems of different dimensions are used, which are usually installed on site. In order to advance the cable ducts to the required positions, it is often required to cut the cable duct systems and to provide branch ducts, as schematically shown in FIG. 1.

One demand which is frequently made to cable duct systems is that these systems have to be able to be walked on by people. For safety reasons, it is thus necessary to configure the cable duct systems such that they comprise sufficient slip resistance in order for a person treading on the cable duct not to slip. For this purpose, a lid with a ribbing on its upper surface is commonly used, said lid being put on the cable duct tray. There are different options for mounting the lid onto the cable duct tray, for instance, latching systems with which the lid latches directly onto the cable duct tray. Spring members and/or clamps by means of which the lid is mounted onto a cable duct tray are also used. Moreover, the use of turn locks or quarter-turn locks which are mounted onto the lid and with the help of which the lid is locked onto the cable duct tray is also well-known.

In the prior art, e.g., a lid for cable duct systems that can be walked on is known, said lid being formed from a curved steel sheet with an aluminum checker sheet riveted onto its upper surface. Quarter-turn locks are commonly used for fixing said lid. In order to mount the quarter-turn locks onto the duct lid, however, it is necessary to provide mounting holes in the lid. For this purpose, a specific step drill is used by means of which a through hole is drilled through the aluminum checker sheet and the steel lid, wherein the aluminum checker sheet is cut in the mounting area by way of the steps of the drill. Such a cable tray system that can be walked on is shown, e.g., in the catalog for cable tray systems that can be walked on published by the company Niedax GmbH & Co. KG.

Furthermore, U-shaped, structured metal lids are well-known, in particular checker sheet lids made of aluminum and steel. Said lids are provided with a ribbing along their whole outer surfaces, i.e., at the lateral parts and the upper surface.

SUMMARY

It is an object of the present invention to provide an improved cable duct lid, a cable duct system equipped therewith, and a corresponding production method, wherein easier mounting, a more economical production, and better recyclability are to be achieved. This object is achieved by the features of the independent claims. Preferred embodiments of the invention are described in the dependent claims.

Accordingly, the present invention relates to a cable duct lid with a cover member that can be walked on and two lateral parts protruding from the cover member, said lateral parts each forming a lateral edge of the lid. The cover member has an upper surface and a lower surface and extends between the two lateral parts. The cover member and the protruding lateral parts preferably define an essentially inverted U-shaped cross section. The two lateral parts of the cable duct lid are configured such that they may be united with the lateral walls of a cable duct tray in order to mount the cable duct lid onto the cable duct tray in a specified position.

The upper surface of the cover member comprises a structured central region that is formed by way of embossing or impressing from the lower surface and that provides a slip-resistant surface. At the upper surface of the cover member, a non-structured periphery is provided on both sides of the structured central region towards the respective lateral edge, said non-structured periphery comprising a width of at least 5 millimeters. The width of the non-structured periphery is preferably 5 millimeters to 50 millimeters, more preferably 10 millimeters to 40 millimeters.

The structured central region may comprise any form of structuring that provides a sufficiently slip-resistant surface. According to the invention, a sufficient slip resistance is given when at least class R10 according to German DIN 51130:2014-02 is achieved. Preferably, the structured central region is configured in the form of a repetitive pattern, e.g., in the form of a riffling.

In a preferred embodiment of the cable duct lid according to the invention, embossed mounting points for mounting fasteners thereon are provided. The embossed mounting points are arranged preferably in a repetitive pattern in a distance of at least 5 millimeters, preferably 5 millimeters to 70 millimeters, and more preferably 10 millimeters to 50 millimeters to the lateral edge. The distance in the longitudinal direction of the cable duct lid is preferably at least at 25 millimeters, preferably between 40 millimeters and 100 millimeters, more preferably between 50 millimeters and 75 millimeters. Sufficient mounting points for mounting the cable duct lid according to the invention are thus achieved in an advantageous manner, independent of the length the lid is cut to during the mounting process.

The mounting points, for instance, are arranged such that they are located in intermediate regions of the embossed structuring of the central region. Preferably, the mounting points are embossed such that each of them defines at least one predetermined breaking point in its peripheries so that an embossed part (punching) of the cover member may be opened by means of breaking the predetermined breaking point, e.g., by knocking out the lower or upper surface of the cover member. During the mounting process, the cable duct lid according to the invention may thus be provided with a fastener (e.g., quarter-turn lock or screw) at any desired position without having to provide a bore. The use of a drilling machine including special tools that has been required to date does no longer apply, no chips are produced, and the mounting is considerably less time-consuming and leads to a better mounting result. The mounting points may be knocked out, e.g., by means of a slight punch mark, wherein the punching is the only scrap that accrues and must be removed. Another advantage in that process is that the mounting points remain closed and the cable duct lid does thus not form any openings in order for dirt and liquids to enter.

The cable duct lid of the present invention is preferably made of metal, in particular of an aluminum or steel sheet. A sandwich structure as disclosed in the prior art is not required. Rather, the duct lid according to the invention is formed as a single layer.

Since the lateral edge of the cable duct according to the invention as well as preferably the lateral parts are non-structured, a simple deformation of the lateral edge is guaranteed during production. Moreover, it is thus also possible to attach lid retaining springs to the lateral parts as no structuring is present there for mounting the cable duct lid according to the invention.

The invention is further directed to a cable duct or a cable duct system or a cable tray system with a cable duct tray, a cable duct lid that can be walked on as described above, and preferably at least one fastener, e.g., at least one lid retaining spring and/or at least one quarter-turn lock in order to mount the cable duct lid onto the cable duct tray.

Preferably, the cable duct tray has a bottom and lateral walls. The lateral walls are preferably provided with embossed mounting points that are configured such that at least one predetermined breaking point is defined in each of their peripheries so that an embossed part (punching) of the lateral wall may be opened by breaking the predetermined breaking point. This breaking process may particularly be carried out by knocking out from the inside or the outside.

Furthermore, the present invention relates to a method for producing a cable duct lid that can be walked on. For this purpose, at first a sheet metal strip with an upper surface and a lower surface is provided, preferably from a roll or a coil. The sheet metal strip is then, e.g., advanced to a forming station by means of which a structured central region is cut or impressed from the lower surface into the sheet metal strip in order to form a slip-resistant surface on the upper surface. Moreover, the two longitudinal edges of the sheet metal strip are bent over and/or chamfered in order to form two lateral parts and a cover member of the cable duct lid located therebetween. The chamfering step may be carried out prior to, together with, or after forming the structured central region. The upper surface of the cover member remains non-structured on both sides of the structured central region to a lateral edge formed by the respective lateral parts and forms a non-structured periphery with a width of at least 5 millimeters. Said width is preferably 5 millimeters to 50 millimeters and more preferably 10 millimeters to 40 millimeters.

The method according to the invention may further comprise a step of embossing mounting points in the central region in order for mounting fasteners. The mounting points are preferably embossed to such an extent that at least one predetermined breaking point forms in each periphery of the mounting points so that an embossed part (punching) of the cover member may be opened by breaking the predetermined breaking point. This step may particularly be carried out by knocking out the lower or upper surface of the cover member.

The mounting points recur preferably in a pattern and are spaced apart from the lateral edge at least 5 millimeters, preferably 5 millimeters to 70 millimeters, and more preferably 10 millimeters to 50 millimeters. The distance of adjacent mounting points to each other in the longitudinal direction is preferably at least 25 millimeters, preferably 40 millimeters to 100 millimeters, more preferably 50 millimeters to 75 millimeters.

With the method according to the invention being a continuous production method, it is particularly advantageous as it enables an effective production process. The cable duct lids may be provided in any desired lengths.

BRIEF DESCRIPTION OF THE DRAWINGS

In the following, preferred embodiments of the invention are described exemplarily with the help of the drawings. The figures show.

DETAILED DESCRIPTION

FIG. 1 shows a schematic view of the use of cable duct systems that can be walked on. As shown, a main duct runs between different machines M and robots R, wherein branch ducts lead to the respective machines M and robots R. It is also apparent that cable duct systems with different widths are used.

Figure 2A:
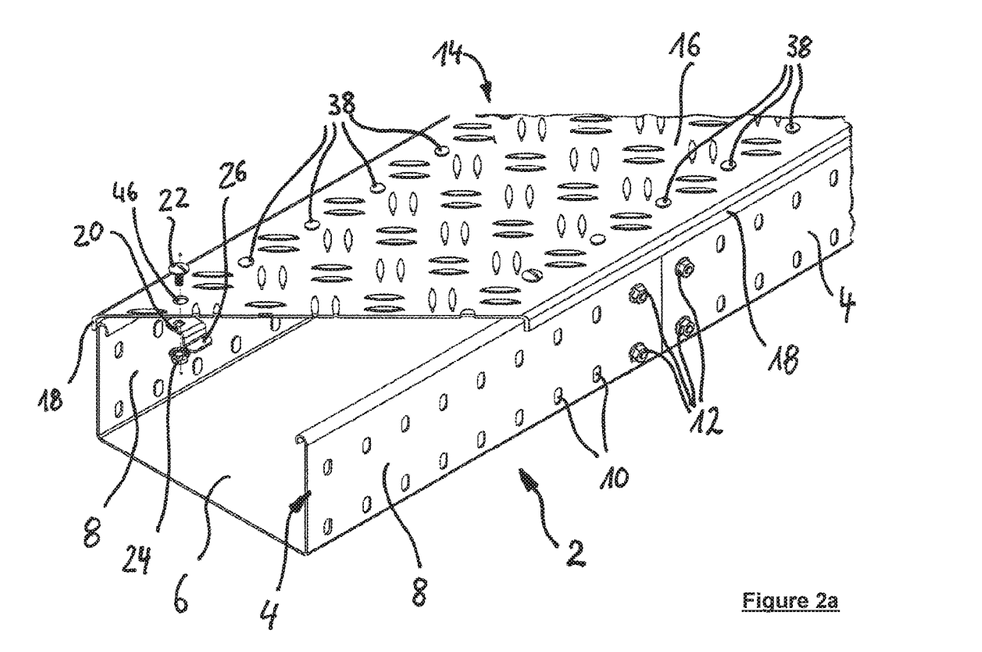
FIG. 2a is a spatial view of a cable duct system according to the invention with the cable duct lid mounted thereon by means of quarter-turn locks.
Figure 2B:
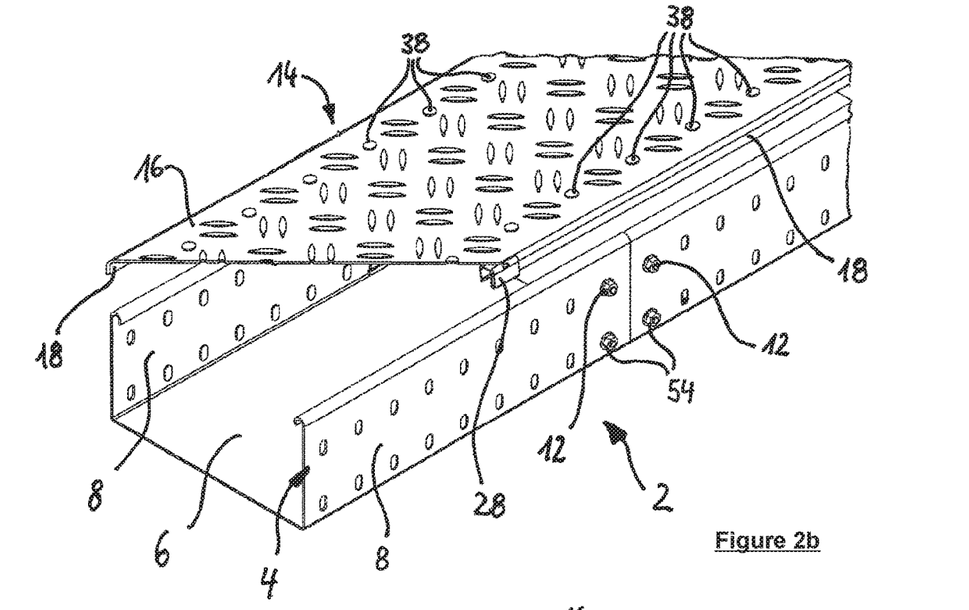
FIG. 2b is a spatial view of a cable duct system according to the invention with the cable duct lid mounted thereon by means of a lid retaining spring.
Figure 2C:
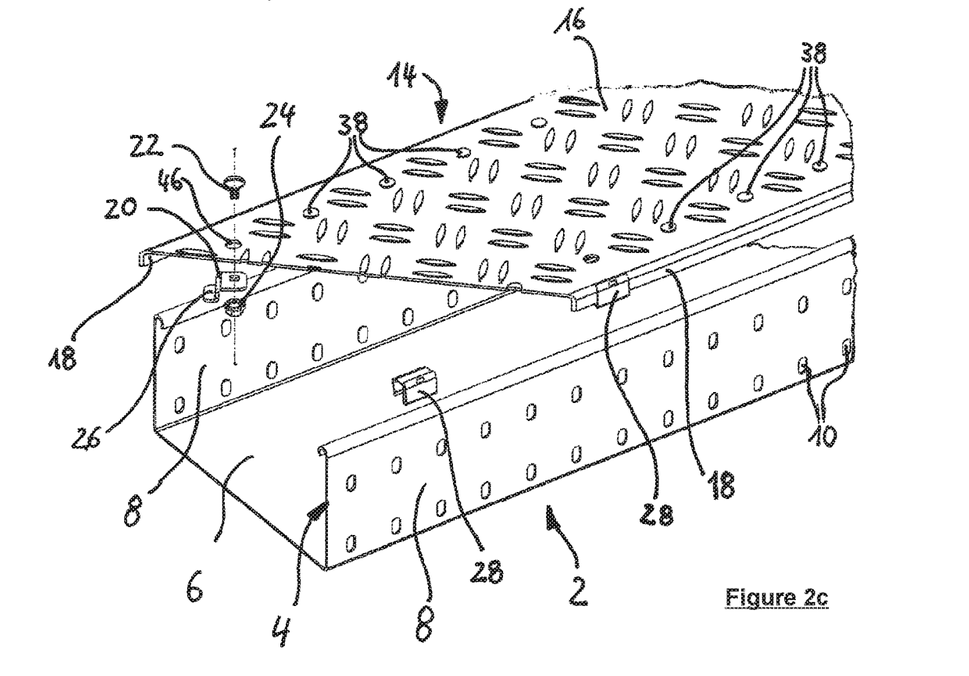
FIG. 2c is a spatial view of a cable duct system with the cable duct lid mounted thereon by means of a quarter-turn lock and a lid retaining spring.

FIGS. 2a to 2c show a spatial view of cable duct systems, i.e., cable ducts 2 according to the invention. The cable duct 2 comprises a cable duct tray 4 with a bottom 6 and lateral walls 8. The lateral walls 8 are typically formed by a forming process, particularly by continuous profiling (edge rolling) or chamfering an originally plane sheet metal strip. At their upper ends, said lateral walls 8 are preferably crimped over inwardly. Furthermore, the lateral walls 8 are provided with mounting points 10 which may, e.g., be formed as openings in order to connect single cable duct elements 4 to each other. To this end, a connector may be provided, e.g., in the transition region from one cable duct tray 4 to the next, said connector connecting the two cable duct trays 4 with each other by means of screws 12. In the following, this process is described in more detail with respect to FIG. 6.

The cable duct 2 according to the invention furthermore has a cable duct lid 14 according to the invention, said cable duct lid being mountable onto the cable duct tray 4. The cable duct lid 14 has a cover member 16 essentially extending over the width of the cable duct tray 4 as well as two lateral parts 18 protruding from the cover member 16. In the embodiment according to FIG. 2a, the cable duct lid 14 that can be walked on according to the invention is illustrated in a condition attached to the cable duct tray 4. In order to fix the cable duct lid 14 to the cable duct tray 4, quarter-turn locks 20 are provided in this embodiment, said quarter-turn locks 20 being screwed on by means of a screw 22 and a screw nut 24. In order to lock the cable duct lid 14 to the cable duct tray 4, the quarter-turn lock is screwed with the help of the screw 22 in such a way that a projecting part 26 engages below the inwardly bent edge of a lateral wall 8 of the cable duct tray.

The embodiment shown in FIG. 2*b* differs from the above-described embodiment according to FIG. 2*a* essentially in that retaining springs 28 come into use for fixing the cable duct lid 14, said retaining springs 28 are, on the one hand, fitted over the lateral parts 18 of the cable duct lid 14 that project downward, and, on the other hand, latched over the edge of the lateral walls 8 of the cable duct tray 4, said edge being bent inward, in order to lock the cable duct lid 14.

The embodiment illustrated in FIG. 2*c* shows that the cable duct lid 14 according to the invention can be fixed to the cable duct tray 4 both with the help of quarter-turn locks 20 and retaining springs 28.

Figure 3:
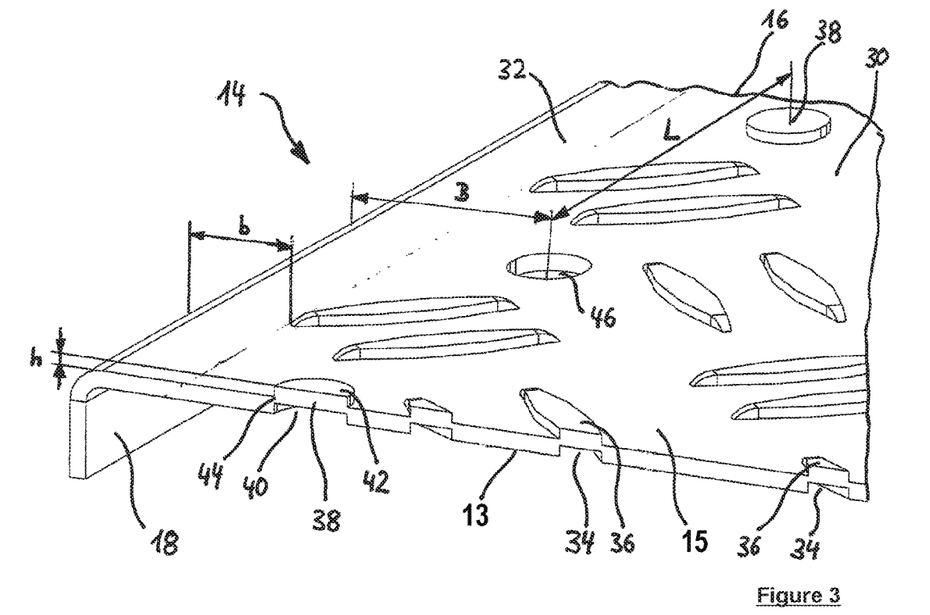
FIG. 3 is a zoomed-in view of an embodiment of a cable duct lid according to the invention.
Figure 4:
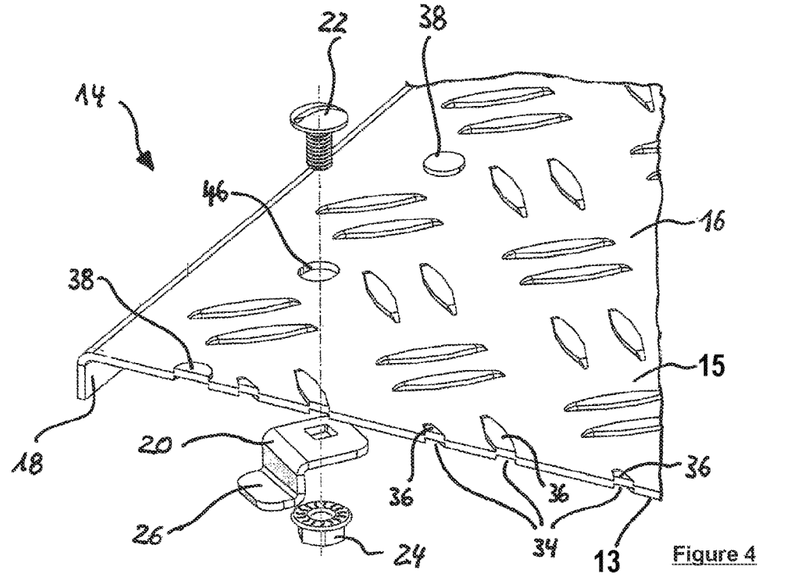
FIG. 4 is a spatial view of the cable duct lid shown in FIG. 3 with a quarter-turn lock.

In the following, an embodiment of the cable duct lid 14 according to the invention is described below in more detail with respect to FIGS. 3 and 4. As already described above, the lid 14 has a cover member 16 which essentially covers the upper opening of the cable duct tray 4, and two lateral parts 18 extending downwards therefrom, each of said lateral parts 18 being able to be brought together laterally with the lateral walls 8 of the cable duct tray 4 in order to fix the lid 14 laterally on the cable duct tray 4.

The lid 14 is preferably produced in a continuous production method. For this purpose, at first a sheet metal strip is produced with a width that corresponds to the overall width of the cover member 16 plus the height of the two lateral parts 18. The sheet metal strip is usually provided in the form of a roll or a coil. The two lateral parts 18, each of which forming a lateral edge of the cable duct lid 14, are preferably formed by bending over and/or chamfering in a continuous forming process.

Fundamentally, the cover member 16 is sectioned into three portions, namely one portion with a central region 30 provided with a structuring, and peripheries 32, each of which facing the lateral edge and being non-structured. The structured central region 30 is formed by embossing or impressing from the lower surface 13 of the sheet metal strip, i.e., the cover member 16. By way of embossing recesses 34 from the lower surface 13, an essentially complementary curvature 36 is formed, thus at large providing a structured central region 30. The structured central region 30 is configured such that on the upper surface 15 of the cover member a slip-resistant surface is formed which at least has a slip resistance of class R10 according to DIN 51130:2014-02. In a preferred embodiment, the structured central region forming the slip-resistant surface is provided in the form of a repetitive pattern, e.g., in the form of a ribbing. Such pattern may easily be embossed or impressed in a continuous production method. An exemplary structuring is the ribbing set up of two parallel ribbing elements each as shown in FIGS. 2*a*, 2*b*, 2*c*, 3 and 4. Said ribbing elements are arranged next to each other in a row, wherein in the subsequent row the ribbing elements are offset thereto at an angle of essentially 90°. In accordance with the invention, however, other structuring may also come into use that provide sufficient slip resistance on the upper surface 15 of the cable duct lid 14.

The two peripheries 32, each of which provided laterally of the central region 30, are non-structured and thus provide an essentially smooth lower and upper surface. The width b of the non-structured periphery 32 is at least 5 millimeters measured from the outer surface of the lateral parts 18 to the nearest structure element of the structured central region 30. Preferably, the width b is 5 millimeters to 50 millimeters, in particular 10 millimeters to 40 millimeters. Although it is preferred that both peripheries 32 have approximately the same width, the widths b may, however, also differ on both sides of the structured central portion 30.

On the one hand, the provision of non-structured peripheries 32 facilitates the production of the lateral parts 18 by allowing for the sheet metal strip to be bent over in an easier manner. On the other hand, the lateral parts 18, which are preferably non-structured, too, may be mounted onto the cable duct tray by using conventional retaining springs.

According to a particularly preferred embodiment of the cable duct lid 14 according to the invention, impressed or embossed potential mounting points 38 are provided in addition to the structuring in the central region 30. Said mounting points 38 are preferably formed in a repetitive pattern along the length. The distance B of the mounting points 38 from the lateral edge of the lid 14 is preferably at least 5 millimeters, more preferably 5 millimeters to 70 millimeters, and particularly preferably 10 millimeters to 50 millimeters. In the longitudinal direction, adjacent mounting points 38 are provided preferably at a distance L from one another, said distance L particularly being at least 25 millimeters and preferably in the range of 40 millimeters to 100 millimeters, more preferably 50 millimeters to 75 millimeters to one another.

The impressed mounting points 38 are only impressed in the produced state of the cable duct lid according to the invention, so that at the inner surface there a recess 40 and at the outer surface a curvature 42 forms. In other words, in the produced state the mounting points 38 are no openings (yet) at which fasteners, e.g., in the form of quarter-turn locks 20, can be mounted with screws 22. Rather, the mounting points 38 form potential options for mounting that may be deployed individually during mounting the cable duct lid according to the invention in order to mount fasteners (e.g., quarter-turn locks 20) thereon. To this end, the embossment or impression for the mounting points 38 is configured such that in a periphery, particularly in the region of the transition of the recess 40 to the curvature 42, a predetermined breaking point 44 forms. Hence, it is guaranteed that the embossed part, i.e., the punching, may be removed by breaking the predetermined breaking point 44 so that an open mounting point 46 may be created. This particularly results in the possibility that—independent of the mounting situation—there are always sufficient mounting points 38 which may be used for locking the lid 14 on a cable duct tray 4. As necessary, the mounting points 38 may, e.g., be opened by simply knocking out with a punch from the inner and/or outer surface in order to mount, e.g., a quarter-turn lock 20 thereon. It is thus always guaranteed that the lid 14 is mounted securely. At the same time, there is no more need for the use of special tools such as step drills, drilling at the mounting site, and so on. The cable duct lid 14 according to the present invention can thus be mounted considerably easier while at the same time improved locking is guaranteed. In doing so, tightness is guaranteed to an extremely high degree, too.

It is preferred that the mounting points 38 in the structured central region 30 are arranged such that they are provided in intervals between the structural elements of the structuring which provides for the slip-resistant surface. In this context, it is to be noted that the slip-resistant property of the cable duct lid according to the invention with a class of at least R10 is achieved only by structuring the central region without the impressed mounting points 38 being taken into account. In consideration of the further structuring by the mounting points 38, it is possible to further increase the slip resistance, in particular up to class R11 or beyond that.

Figure 5:
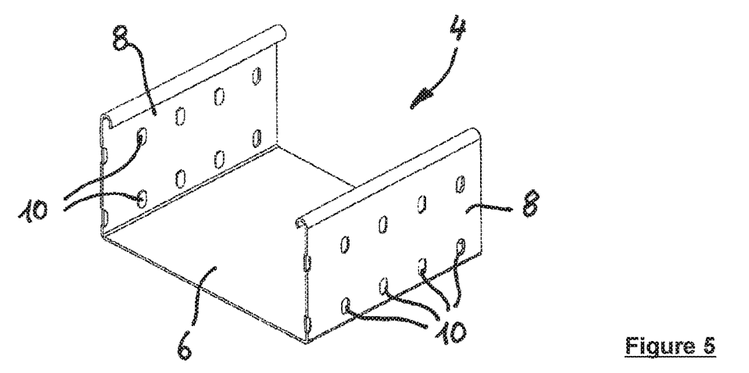
FIG. 5 is a spatial view of a cable duct tray to be used with a cable duct system according to the invention.
Figures 6, 7:
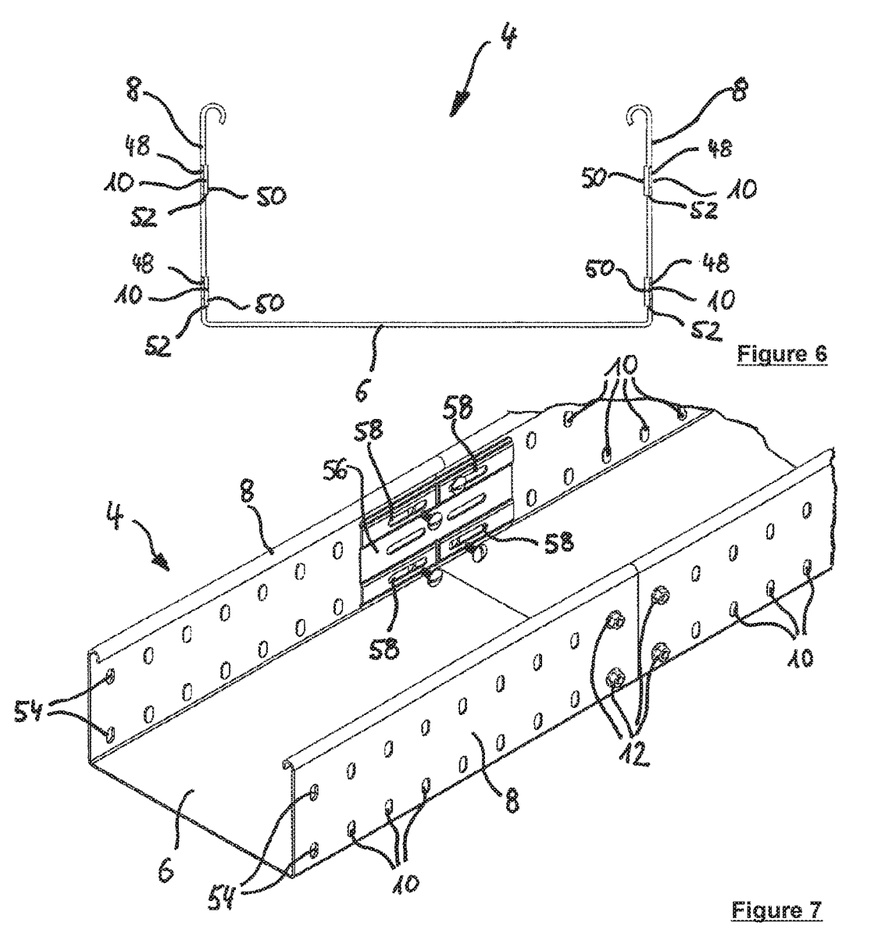
FIG. 6 is a cross section through the tray according to FIG. 5.
FIG. 7 is a spatial view of the connection of a plurality of cable duct trays according to FIG. 5 with each other.

In the following, a cable duct tray 4 according to the invention, in particular for the use with a cable duct lid 14 according to the invention, is described in more detail with the help of FIGS. 5, 6, and 7. As has already been described beforehand in connection with FIGS. 2a, 2b, and 2c, the cable duct tray 4 has a bottom 6 and lateral walls 8. In the area of the lateral walls 8, embossed or impressed mounting points 10 are provided. Similar to the mounting points 38, the mounting points 10 are embossed or impressed in the cable duct lid 14 during the production process and form potential mounting points. Thus, also the mounting points 10 are closed in the produced state, as can particularly clearly be seen in the cross-sectional view according to FIG. 6. All of the mounting points 10 each have a recess 48 which is preferably located at the outer surface of the lateral walls 8 but which can also be provided at the inner surface thereof, as well as—formed essentially complementary thereto—a curvature 50 at the respective opposite side. In turn, in the transition region between the recess 48 and the curvature 50 a predetermined breaking point 52 is provided which can be broken in order to open the mounting points 10. This may be done, e.g., by simply knocking out the embossed part or the impressed punching from the inside or the outside. In this way, the prefabricated mounting points 10 may individually and according to requirements be changed to be open mounting points 54 at which adjacent cable duct trays may be connected to each other in the longitudinal direction. This is shown in more detail in FIG. 7. Preferably, a connection member 56 mounted on the respective lateral wall 8 is used in order to connect adjacent cable duct trays 4. The connection member 56 preferably has at least two, preferably at least four slots 58 configured such that all hole spacings in the longitudinal directions of adjacent mounting points 10 and/or 54 may be used in order to connect the cable duct trays 4 to each other.

Thus, the present invention provides a cable duct system which can be deployed highly flexibly and efficiently. Moreover, it can be produced easily and cost effective and is thus considerably advantageous over the prior art at simultaneously increased slip resistance.

What is claimed is:

1. A cable duct lid that can be walked on comprising:
   a cover member having an upper surface and a lower surface; and
   two lateral parts protruding from the cover member, each of said lateral parts defining a lateral edge of the cable duct lid;
   wherein the upper surface of the cover member comprises a structured central region that is formed by way of embossing from the lower surface and that provides a slip-resistant surface, and
   wherein the upper surface of the cover member comprises a non-structured periphery with a width of at least 5 millimeters on both sides of the structured central region towards the respective lateral edge.

2. The cable duct lid that can be walked on according to claim 1, wherein the cover member and the protruding lateral parts define an essentially inverted U-shaped cross section.

3. The cable duct lid that can be walked on according to claim 1, wherein the width of the non-structured peripheries is between 5 millimeters and 50 millimeters, preferably between 10 millimeters and 40 millimeters.

4. The cable duct lid that can be walked on according to claim 1, wherein the structured central region that provides the slip-resistant surface comprises a repetitive pattern, in particular in the form of a ribbing.

5. The cable duct lid that can be walked on according to claim 1, wherein the cover member comprises embossed mounting points for mounting fasteners thereon.

6. The cable duct lid that can be walked on according to claim 5, wherein the mounting points are arranged in a repetitive pattern in a distance of at least 5 millimeters, preferably 5 millimeters to 70 millimeters, and more preferably 10 millimeters to 50 millimeters to the lateral edge, and at a distance of at least 25 millimeters, preferably between 40 millimeters and 100 millimeters, more preferably between 50 millimeters and 75 millimeters to each other in the longitudinal direction of the cable duct lid.

7. The cable duct lid that can be walked on according to claim 5, wherein the mounting points are arranged such that the mounting points are located in intermediate regions of the structuring of the central region.

8. The cable duct lid that can be walked on according to claim 5, wherein the mounting points are embossed such that each of the mounting points defines at least one predetermined breaking point in its periphery so that an embossed part of the cover member may be opened by means of breaking the predetermined breaking point, in particular by knocking out from the lower or upper surface of the cover member.

9. The cable duct lid that can be walked on according to claim 1, wherein the cable duct lid is formed as a single layer from a metal, particularly an aluminum or steel sheet.

10. The cable duct lid that can be walked on according to claim 1, wherein the lateral parts are non-structured.

11. A cable duct comprising:
    a cable duct tray;
    a cable duct lid that can be walked on according to claim 1, and
    at least one fastener, in particular at least one lid retaining spring and/or at least one quarter-turn lock in order to mount the cable duct lid onto the cable duct tray.

12. The cable duct according to claim 11, wherein the cable duct tray comprises a bottom and lateral walls, wherein embossed mounting points are provided in the lateral walls, wherein the mounting points are embossed such that each of the mounting points defines at least one predetermined breaking point in its periphery so that an embossed part of the lateral wall may be opened by means of breaking the predetermined breaking point, in particular by knocking out from an inner or outer side of the lateral wall.

13. A method for producing a cable duct lid that can be walked on comprising the steps of:
    a) providing a sheet metal strip with an upper surface, a lower surface, and two longitudinal edges;
    b) embossing a structured central region from the lower surface in order to form a slip-resistant surface on the upper surface; and
    c) forming the two longitudinal edges of the sheet metal strip in order to form two lateral parts and a cover member of the cable duct lid located therebetween;
       wherein the upper surface of the cover member comprises a non-structured periphery with a width of at least 5 millimeters on each of both sides of the structured central region to a lateral edge formed by the respective lateral part.

14. The method according to claim 13, further comprising the step of embossing mounting points in the central region for mounting fasteners, in particular such that at least one predetermined breaking point is defined in each periphery of the mounting points so that an embossed part of the cover member may be opened by breaking the predetermined breaking point, in particular by knocking out from the lower or upper surface of the cover member.

15. The method according to claim 14, wherein the mounting points are embossed in a repetitive pattern at a distance of at least 5 millimeters, preferably 5 millimeters to 70 millimeters, and more preferably 10 millimeters to 50 millimeters from the lateral edge and with a distance of at least 25 millimeters, preferably 40 millimeters to 100 millimeters, more preferably 50 millimeters to 75 millimeters to each other in the longitudinal direction of the cable duct lid.

* * * * *